(12) United States Patent
Clark

(10) Patent No.: US 6,190,322 B1
(45) Date of Patent: Feb. 20, 2001

(54) ULTRASONIC IMAGING SYSTEM AND METHOD USING LINEAR CANCELLATION

(75) Inventor: David W Clark, Windham, NH (US)

(73) Assignee: Agilent Technologies, Inc., Palo Alto, CA (US)

(*) Notice: Under 35 U.S.C. 154(b), the term of this patent shall be extended for 0 days.

(21) Appl. No.: 09/342,820

(22) Filed: Jun. 29, 1999

(51) Int. Cl.$^7$ .................................................. A61B 8/00
(52) U.S. Cl. ........................................... 600/443; 600/447
(58) Field of Search .................................. 600/437, 440, 600/441, 443, 447, 455, 458; 73/597; 367/135

(56) References Cited

U.S. PATENT DOCUMENTS

| | | | |
|---|---|---|---|
| 5,456,257 | 10/1995 | Johnson et al. ........................ | 600/458 |
| 5,577,505 | 11/1996 | Brock-Fisher et al. ................ | 600/458 |
| 5,632,277 | 5/1997 | Chapman et al. ..................... | 600/443 |
| 5,706,819 | 1/1998 | Hwang et al. ......................... | 600/458 |
| 5,833,613 | * 11/1998 | Averkiou et al. ...................... | 600/440 |
| 6,095,980 | * 8/2000 | Burns et al. ........................... | 600/453 |

OTHER PUBLICATIONS

"Pulse Inversion Doppler: A New Method For Detecting Nonlinear Echoes From Microbubble Contrast Agents", Simpson, et al; IEEE; vol. 46 No. 2, Mar. 1999.
"The Effect Of The Phase Of Transmission On Contrast Agent Echoes", Morgan, et al; IEEE vol. 45 No. 4, Jul. 1998.
"Optical And Acoustical Observations Of The Effects Of Ultrasound On Contrast Agents", Dayton, et al.; IEEE vol. 46. No. 1, Jan. 1999.

* cited by examiner

Primary Examiner—Marvin M. Lateef
Assistant Examiner—Ali M. Imam

(57) ABSTRACT

Disclosed is a system and method for generating an ultrasound echo signal with reduced linear components. In one embodiment, the system comprises an excitation signal source configured to generate a first excitation signal and a second excitation signal, and a transducer coupled to the excitation signal source, the transducer being configured to emit a first asymmetric ultrasonic pulse in response to the first excitation signal and a second asymmetric ultrasonic pulse in response to the second excitation signal, the first and second asymmetric ultrasonic pulses being emitted into a medium. The system also entails a beamformer coupled to the transducer, the beamformer configured to generate a first echo signal and a second echo signal received by the transducer from the medium in response to the first and second asymmetric ultrasonic pulses, and an envelope detector coupled to the beamformer, the envelope detector configured to generate a first echo envelope from the first echo signal and a second echo envelope from the second echo signal. The present system also includes an acoustic line memory coupled to the envelope detector configured to store the first echo envelope, and an arithmetic junction coupled to the envelope detector, the arithmetic junction configured to subtract the first echo envelope from the second echo envelope, thereby canceling nonlinearities.

13 Claims, 4 Drawing Sheets

ULTRASONIC IMAGING SYSTEM AND METHOD USING LINEAR CANCELLATION

TECHNICAL FIELD

The present invention is generally related to the field of ultrasonic imaging, and, more particularly, is related to a system and method for ultrasonic imaging using linear cancellation.

BACKGROUND OF THE INVENTION

Ultrasonic imaging systems hold the promise of picturing the inner workings of a particular medium such as a human body without invasive surgical procedures, etc. Generally, such systems generate ultrasonic pulses that propagate through the body or other medium and the various structures therein generate echoes that are detected by the ultrasonic system. These echoes are used to generate an image of the interior structure of the medium.

In some cases, the medium may exhibit a nonlinear response to the ultrasonic pulses. At times, it is desirable to isolate the non-linearity in the medium to generate images of the medium in question. Among the techniques that have been developed to isolate the non-linearities is harmonic imaging. In harmonic imaging, a narrowband ultrasonic pulse is transmitted into the medium and the echo signals received are filtered to isolate the second harmonic that is believed to contain primarily non-linear echo information. However, this approach provides poor spatial resolution because it is a narrowband technique.

Another approach is to use phase inversion techniques to cancel out linearities. According to this approach, a relatively wideband, ultrasonic pulse is first transmitted into the medium. Shortly thereafter, the same pulse with an inverted polarity is transmitted as well. The received echo signals are added to each other, and presumably any linearities are canceled. Unfortunately, this approach suffers due to its susceptibility to motion artifact that results in unsatisfactory imaging.

SUMMARY OF THE INVENTION

The present invention provides a system and method for generating an ultrasound echo signal with reduced linear components. In one embodiment, the present system comprises an excitation signal source configured to generate a first excitation signal and a second excitation signal, and a transducer coupled to the excitation signal source, the transducer being configured to emit a first asymmetric ultrasonic pulse in response to the first excitation signal and a second asymmetric ultrasonic pulse in response to the second excitation signal, the first and second asymmetric ultrasonic pulses being emitted into a medium. The system also entails a beamformer coupled to the transducer, the beamformer configured to generate a first echo signal and a second echo signal received by the transducer from the medium in response to the first and second asymmetric ultrasonic pulses, and an envelope detector coupled to the beamformer, the envelope detector configured to generate a first echo envelope from the first echo signal and a second echo envelope from the second echo signal. The present system also includes an acoustic line memory coupled to the envelope detector configured to store the first echo envelope, and an arithmetic junction coupled to the envelope detector, the arithmetic junction configured to subtract the first echo envelope from the second echo envelope, thereby generating a nonlinear echo signal.

The present invention can also be viewed as providing a method for generating a nonlinear ultrasound echo signal with reduced linear components. In this regard, the method can be broadly summarized by the following steps: consecutively generating a first asymmetric ultrasonic pulse and a second asymmetric ultrasonic pulse, the first and second asymmetric ultrasonic pulses being emitted into a medium, thereby generating a first and second echo signals, respectively; generating a first envelope signal from the first echo signal and a second envelope signal from the second echo signal; and performing a subtraction between the first envelope signal and the second envelope signal, thereby generating the nonlinear ultrasound echo signal.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention.

Moreover, in the drawings, like reference numerals designate corresponding parts throughout the several views.

DETAILED DESCRIPTION OF THE PREFERRED EMBODIMENT

Figure 1:
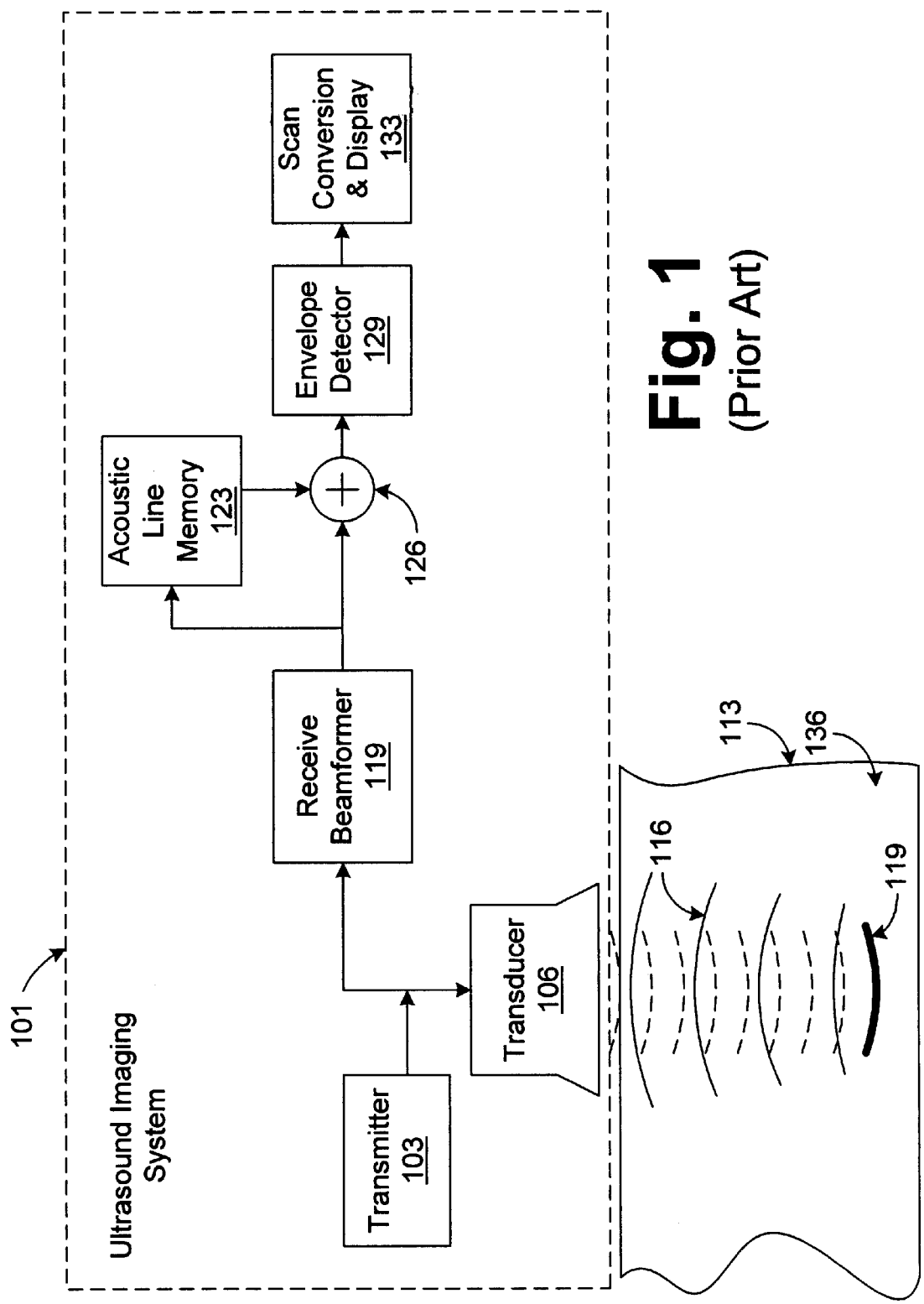
FIG. 1 is a functional block diagram of a phase inversion ultrasonic imaging system.

With reference to FIG. 1, shown is a functional block diagram of an ultrasonic imaging system 101 that employs phase inversion techniques. The ultrasonic imaging system 101 may be virtually any type of ultrasound imaging system, for example but not limited to, a brightness-mode (B-mode) system, a Doppler-based imaging system, a color flow imaging system, etc., as well as a custom manufactured ultrasound imaging system.

In employing phase inversion techniques, the ultrasonic imaging system 101 includes a transmitter 103 that provides excitation signals to a transducer 106 that generates an ultrasonic pulse 109 in response thereto that is generally symmetrical in form. The ultrasonic pulse 109 is transmitted into a medium 113 that may be, for example, a human body or other medium. As the ultrasonic pulse travels through the medium in question, the various portions of the medium 113 that lie in the path of the ultrasonic pulse 109 create a pulse echo 116 as the ultrasonic pulse travels therethrough. These pulse echoes 116 are detected by the transducer 106 that generates electrical signals that are applied to a receive beamformer 119.

The transducer 106 may be any suitable type of transducer, including a phased array transducer, etc. If a phased array transducer is employed, then several elements in the phase array each transmit the ultrasonic pulse 109 and receive the pulse echoes 116, generating a corresponding electrical signal therefrom. The receive beamformer 119 receives the signal or signals generated by the transducer 196 due to the pulse echoes 116 and generates a single echo signal therefrom. In particular, the receive beamformer 119 employs various time delays to focus the receiving capability of the transducer 106 on a particular position in the medium 113. In the usual case, this position follows the propagation of the ultrasonic pulse 109 along a predetermined axis to obtain echo information about the medium along that particular axis.

The echo signal generated by the receive beamformer 119 is then provided to both an acoustic line memory 123 and an adder 126. The output of the acoustic line memory 123 is also applied to the adder 126. The output of the adder 126 is applied to an envelope detector 129 that generates a resulting echo envelope. The echo envelope is thereafter applied to a scan converter/display 133 that generates a rendering of the image from one or more echo envelopes, etc.

As the ultrasonic pulse 109 progresses through the medium 113, the various regions or structures within the medium 126 cause echoes 116 to scatter back to the transducer 106. Generally, a single ultrasonic pulse 109 generates echoes 116 that last as long as the pulse propagates through the medium 113. Note that the medium 13 may be comprised of different matter at various densities and states that may have various linear and non-linear responses.

The medium 113 may be, for example, a portion of a human body, etc. In some cases, a contrast agent may be added to, for example, the blood stream in a human body that gives the blood stream a strong non-linear response. Such a contrast agent may be, for example, a microbubble contrast agent in which microscopic air bubbles, or microbubbles, are injected into the blood. Microbubbles tend to have a strong nonlinear response to ultrasonic pulses 109 due in part to the characteristics surrounding the compressibility of air bubbles. As a consequence, blood that is profuse with microbubbles would have a strong nonlinear response when stimulated by the ultrasonic pulse 109. If this stronger nonlinearity could be isolated from weaker nonlinearities and from relatively linear responses of the tissue and other structures surrounding the blood, then it would be possible to generate a rendering on the display 133 of the blood itself, thereby gaining valuable insight as to the nature of the blood flow at various points in the human body, etc. Even without such contrast agents, the weaker nonlinear propagation sound waves generate echoes that can produce a higher quality image if the linear responses are suppressed.

Figure 2A:
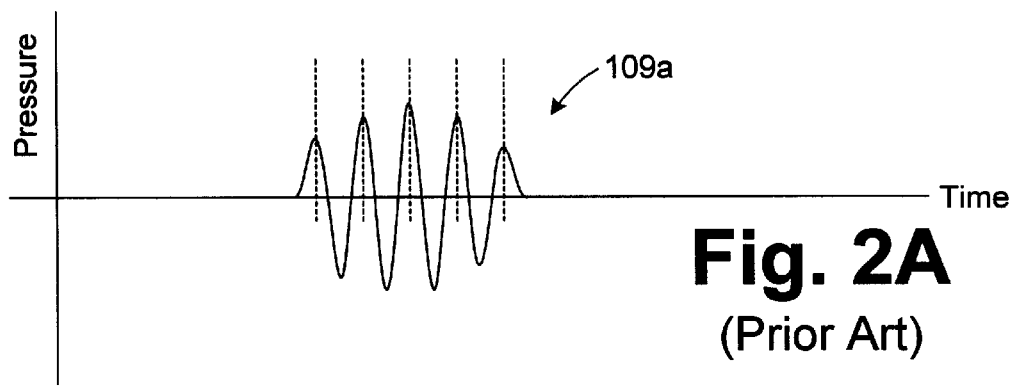
FIG. 2A is a graph of a first symmetrical ultrasonic pulse employed in the ultrasonic imaging system of FIG. 1.

With reference to FIGS. 2A–2D, shown are waveforms that are employed with the ultrasonic imaging system 101 (FIG. 1). The waveforms are discussed to illustrate the operation of the ultrasonic imaging system 101 using a phase inversion technique to isolate nonlinearities in the medium 113 (FIG. 1). First, in FIG. 2A shown is graph of the pressure of a first ultrasonic pulse 109a in terms of time. Note that the first ultrasonic pulse 109a is often symmetrical above and below the zero axis. Upon transmitting the first ultrasonic pulse 109a into the medium 113, a first echo signal is generated as previously discussed and stored in the acoustic line memory 123 (FIG. 1).

Figure 2B:
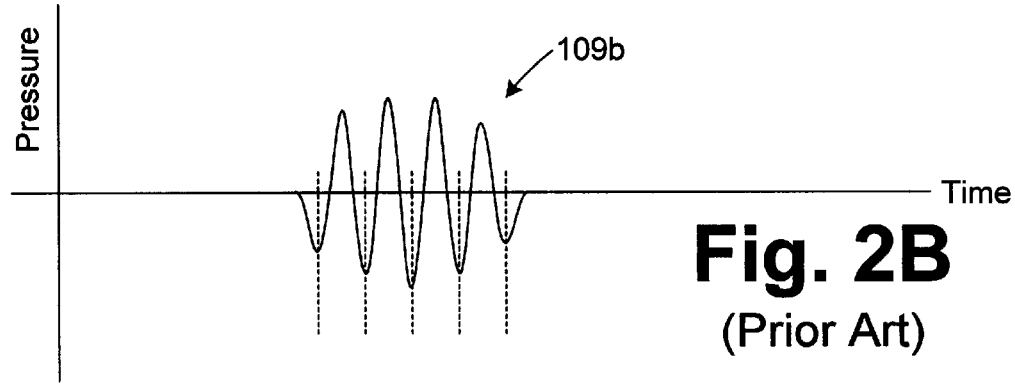
FIG. 2B is a graph of a second symmetrical ultrasonic pulse employed in the ultrasonic imaging system of FIG. 1.
Figure 2C:
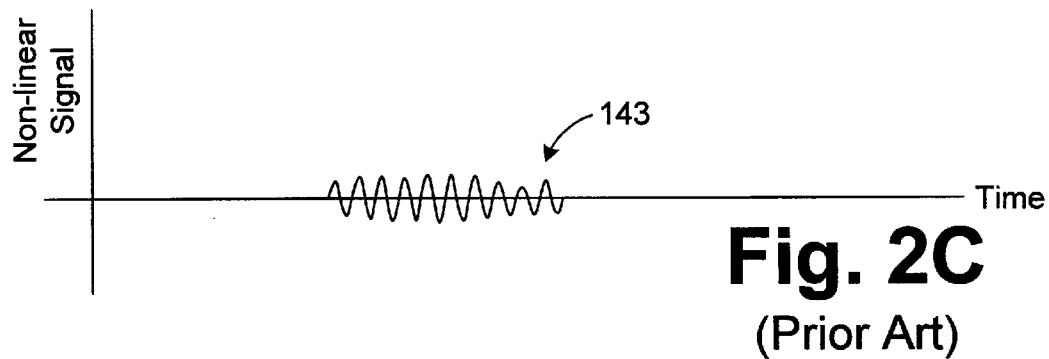
FIG. 2C is a graph of a nonlinear echo signal produced by the ultrasonic imaging system of FIG. 1.

Next, with reference to FIG. 2B, a second ultrasonic pulse 109b is transmitted into the medium 113 that is 180° out of phase with the first ultrasonic pulse 108a. A second echo signal is generated from the second ultrasonic pulse 109b. The first echo signal stored in the acoustic line memory 123 and the second echo signal are both applied to the adder 126, thereby generating a nonlinear signal 143 as shown in FIG. 2C. In effect, the linear portion of the first echo signal cancels the linear portion of the second echo signal due to the fact that the second ultrasonic pulse 109b is 180° out of phase with the first ultrasonic pulse 108a, resulting in the nonlinear signal 143. The nonlinear signal 143 has a frequency that is twice that of the ultrasonic pulses 109a and 109b which accounts for the fact that much of the nonlinear response is found at the second harmonic of the base frequency of the ultrasonic pulses 109a and 109b.

Figure 2D:
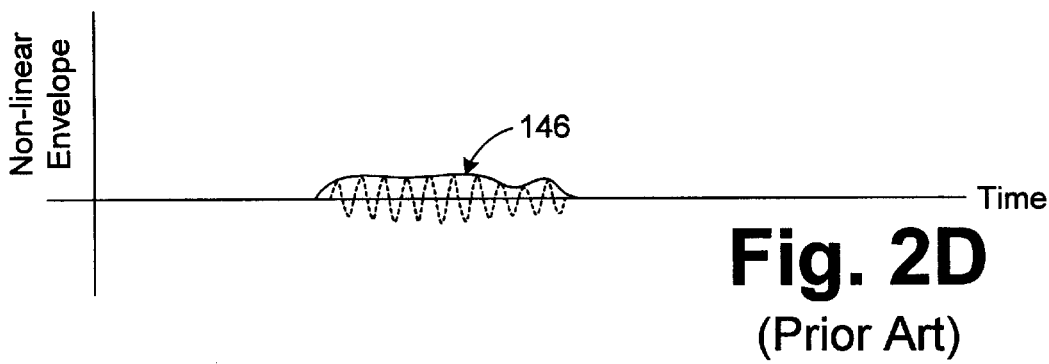
FIG. 2D is a graph of a nonlinear echo envelope produced by the ultrasonic imaging system of FIG. 1.

Thereafter, as shown in FIG. 2D, this nonlinear signal 143 is applied to the envelope detector 129 (FIG. 1) that generates a nonlinear envelope signal 146 that is applied to the scan conversion and display 133.

The phase inversion technique detailed above is not without significant problems. One such problem relates to the fact that phase inversion techniques process "radio frequency" (RF) waveforms that are generally high frequency in nature. In the context of ultrasound, the term "RF waveforms" generally refers to echo signals as they exist before envelope detection so that they are of a relatively high frequency with high frequency peaks such as is the case with the first and second ultrasonic pulses 109a and 109b. The RF waveforms employed make phase inversion techniques susceptible to adverse effects due to slight movement in the medium 113, such as is the case with a beating heart in a human body, etc. In these situations, the second echo signal will differ from the first due to the movement and, consequently, the linear cancellation is adversely effected because a slight misalignment results.

Attempts to address this misalignment problem are seen in pulse inversion Doppler techniques that use more than two ultrasonic pulses along with elaborate filters, etc. Such techniques attempt to address the misalignment problem but create an additional problem in that more acoustic lines are transmitted and received thereby reducing the frame rate adversely.

Figure 3:
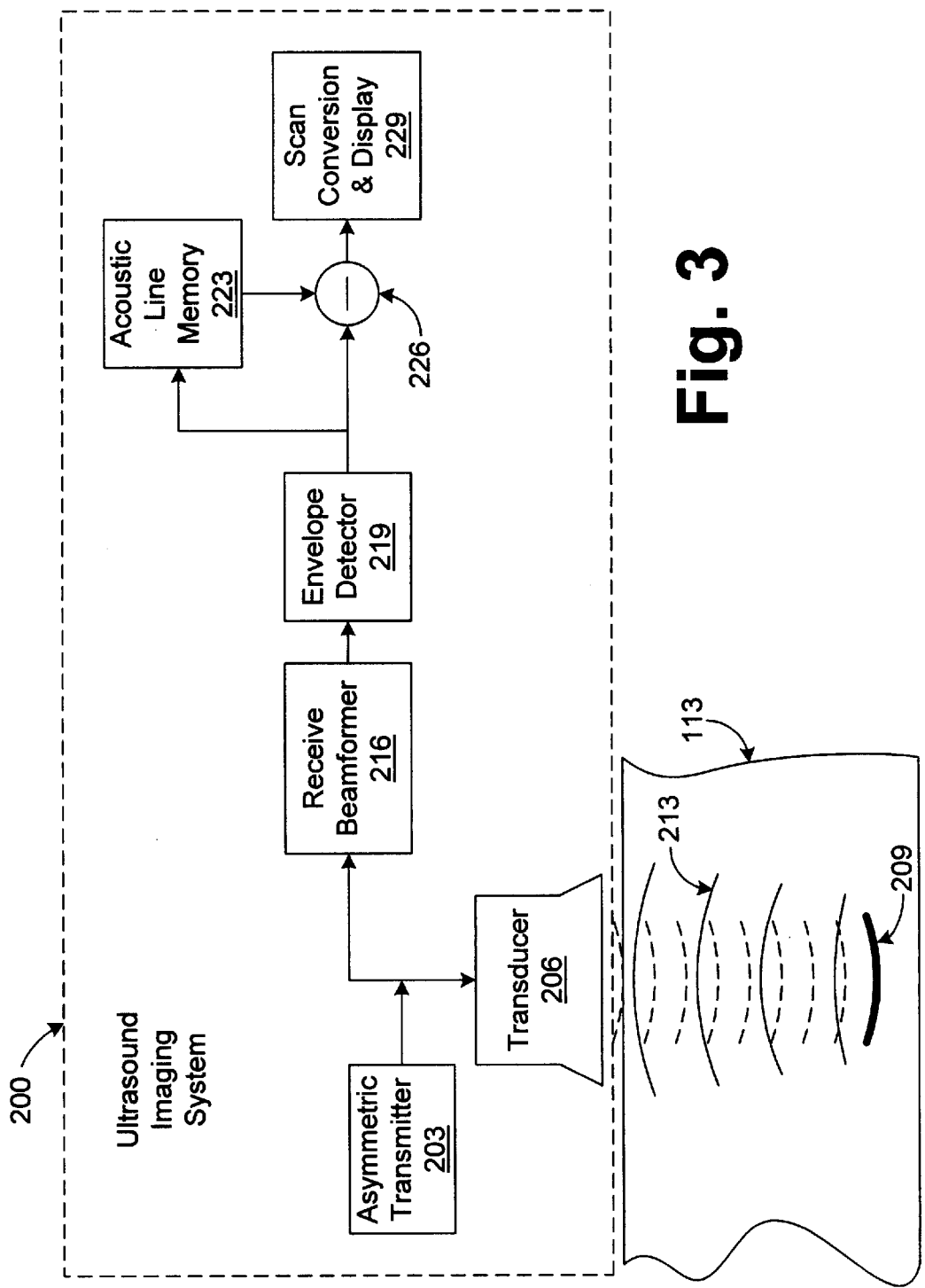
FIG. 3 is a functional block diagram of an ultrasonic imaging system according to the present invention.

With reference to FIG. 3, shown is an ultrasound imaging system 200 according to an embodiment of the present invention. The ultrasound imaging system 200 may generally be any type of ultrasound imaging system, for example but not limited to, a brightness-mode (B-mode) system, a Doppler-based imaging system, a color flow imaging system, etc.

In one embodiment, the ultrasound imaging system 200 includes an asymmetric transmitter 203 that generates an excitation signal that is applied to a transducer 206. In response, the transducer 206 generates an asymmetric ultrasonic pulse 209. Note that the excitation signal generated by the asymmetric transmitter 203 may not actually appear asymmetric, however, the excitation signal generated by the asymmetric transmitter 203 ultimately results in an asymmetric ultrasonic pulse 209 when applied to an appropriate transducer 206.

The asymmetric ultrasonic pulse 209 then propagates through the medium 113, resulting in echoes 213 that propagate back to the transducer 206. The transducer 206 generates echo signals from the received echoes that are applied to a receive beamformer 216. Note that in the transducer 206 is a phased array transducer that generates multiple echo signals from a number of elements in the array, however, other suitable types of transducers other than phased array transducers may be employed as well. The receive beamformer 216 generates a summed echo signal from the echo signals by applying appropriate delays to the various echo signals to focus on echoes from particular points in the medium as desired, such as along the axis of propagation of the asymmetric ultrasonic pulse 209. The receive beamformer 216 applies the summed echo signal to the envelope detector 219 that generates an echo envelope signal therefrom. The echo envelope signal is applied to both an acoustic line memory 223 and an arithmetic unit acting as a subtractor 226. The output of the subtractor 226 is applied to a scan conversion and display 229 that generates an ultrasonic image.

Note that the various components of the functional block diagram of FIG. 3 may also include other components between and around those shown, where the components shown are to facilitate the explanation of the present invention. Thus, it is understood that the various embodiments of the present invention are not limited to configurations with only those components shown in FIG. 3.

Figure 4:
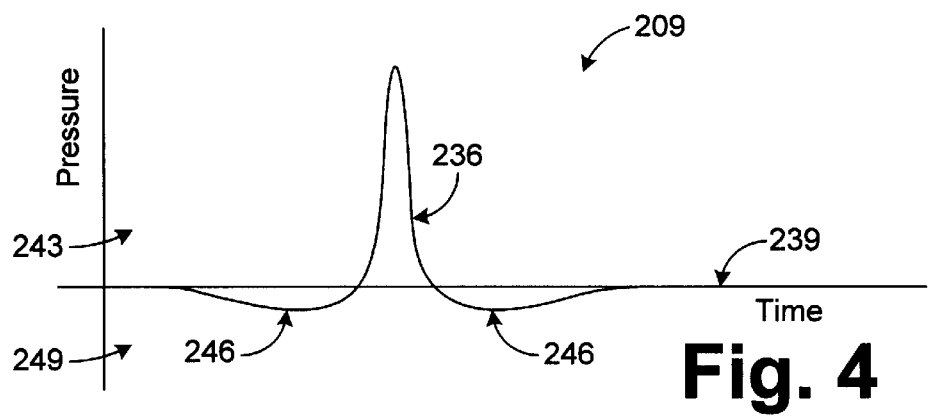
FIG. 4 is a graph of a first asymmetrical ultrasonic pulse employed in the ultrasonic imaging system of FIG. 3.

Turning to FIG. 4, shown is a graph of an example of the asymmetric ultrasonic pulse 209. The asymmetric ultrasonic pulse 209 is generally characterized by at least one extended pressure peak 236 on a first side 243 of the zero pressure axis 239 and at least one shallow pressure peak 246 on a second side 249 of the zero pressure axis 239, where various numbers of the extended and shallow pressure peaks 236 and 246 may be employed. Thus, it may be possible that the asymmetric ultrasonic pulse 209 include a number of extended pressure peaks 236 on the first side 243 and a number of shallow pressure peaks 246 on the second side 249.

Regardless of the number of extended and shallow pressure peaks 236 and 246, it is understood that the extended pressure peak(s) 236 should have a magnitude that is greater than the magnitude of the shallow pressure peak(s) 246. The greater the difference in these magnitudes, then the resulting nonlinear response will be correspondingly greater and more distinct as will be discussed. For the best results, the extended pressure peak(s) 236 preferably exceed the magnitude of the shallow pressure peak(s) 246 by a factor of at least two, although any ratio may ultimately be used if the results obtained are adequate for the specific application. Since the shape of the asymmetric ultrasonic pulse 209 represents a pressure perturbation from the ambient pressure, the asymmetric ultrasonic pulse 209 is considered to have a zero average value. This generally implies that the extended pressure peak(s) 236 will have a shorter time extent than the shallow pressure peak(s) 246.

Figure 5A:
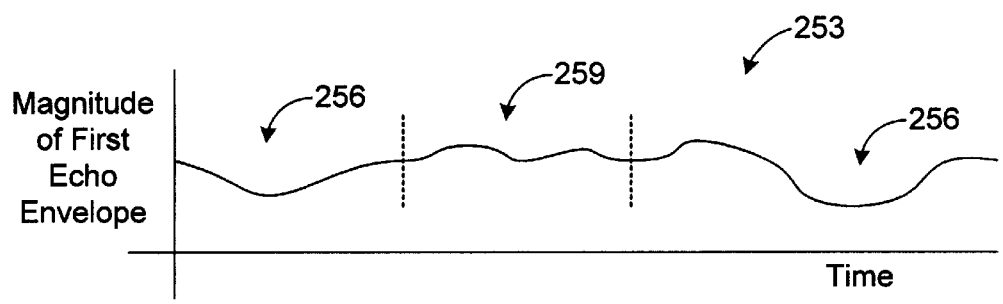
FIG. 5A is a graph of a first echo envelope produced by the ultrasonic imaging system of FIG. 3.

With reference to FIG. 5A, shown is a first echo envelope signal 253 generated by the envelope detector 219. The first echo envelope signal 253 results from a first asymmetric ultrasonic pulse 209a (FIG. 4) applied to the transducer 206 (FIG. 3). Note the first echo envelope signal 253 is relatively smooth as the portion shown is from a relatively small duration of time, where the echo signals from which the first echo envelope signal 253 may be generated from a portion of the medium 113 that is only a few millimeters thick. However, this portion is shown to clearly illustrate the features of the present invention that follow.

In particular, the first echo envelope signal 253 includes linear portions 256 and a nonlinear portion 259. The nonlinear portion 259 may result, for example, from echoes received from a blood vessel in the medium which contains blood that is profuse with the microbubble contrast agent as discussed previously. During the operation of the ultrasonic imaging system 200 (FIG. 3), the first echo envelope signal 253 is generated and then stored in the acoustic line memory 223.

Figure 5B:
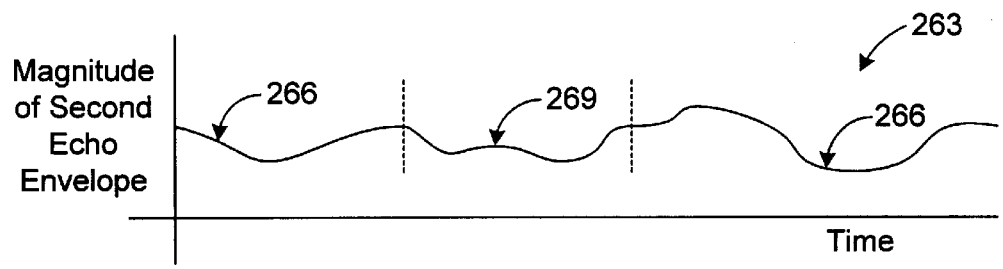
FIG. 5B is a graph of a second echo envelope produced by the ultrasonic imaging system of FIG. 3.

Thereafter, with reference to FIG. 5B, a second echo envelope signal 263 is generated in rapid succession of the first echo envelope signal 253 (FIG. 5A). Although the second echo envelope signal 263 is shown as have a positive magnitude, the second echo envelope signal 263 is generated from a second asymmetric ultrasonic pulse 209b that is an inverted version of the first asymmetric ultrasonic pulse 209a. The second echo envelope signal 263 detected is generally the absolute value of the second echo signal received. Note that since the polarity of the second asymmetric ultrasonic pulse 209b is inverted from the first asymmetric ultrasonic pulse 209a, the linear portions 266 are approximately equal to the linear portions 256 of the first echo envelope signal 253. However, since the magnitudes of the first and second asymmetric ultrasonic pulses 209a and 209b differ substantially due to the fact that the second is an inverted copy of the first, the nonlinear portions 259 and 269 will differ substantially.

Figure 5C:
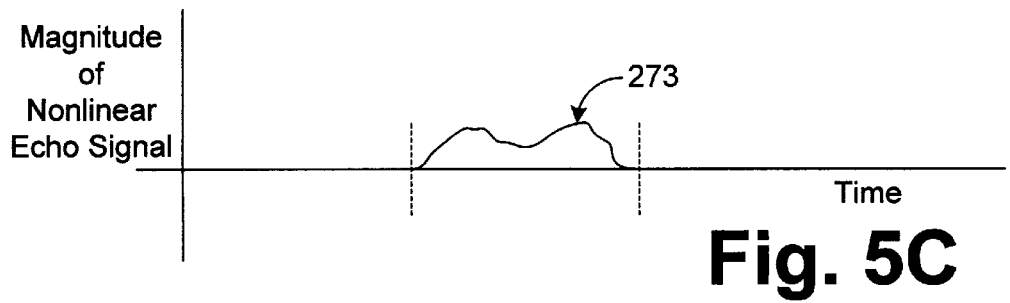
FIG. 5C is a graph of a nonlinear echo signal produced by the ultrasonic imaging system of FIG. 3 from the first and second echo envelopes of FIGS. 5A and 5B.

With reference to FIG. 5C, once the second echo envelope signal 263 (FIG. 5B) is generated, both the first and second envelope signals 253 (FIG. 5A) and 263 are applied to the subtractor 226 (FIG. 3). The resulting output of the subtractor 226 is a nonlinear echo signal 273 due to the cancellation of linear portions. The nonlinear echo signal 273 is applied to the scan conversion and display 229 (FIG. 3) and an appropriate image generated therefrom.

The ultrasonic imaging system 200 provides a significant advantage over the phase inversion imaging systems in that linear cancellation is achieved with much less susceptibility to error due to slight movement in the medium 113. In particular, since the echo envelopes are taken before linear cancellation, slight differences in the echo signals due to changes in position of the medium 113, such as, for example the position of a wall of a beating heart, do not obscure the linear cancellation to a great degree. In the case of a beating heart, it is preferable that the second asymmetric ultrasonic pulse 209b follows the first asymmetric ultrasonic pulse 209a as closely as possible to provide for minimum movement of the heart walls therebetween. Nonetheless, slight movement is practically impossible to avoid due to the maximum speed of sound, etc. Advantageously, the present invention overcomes the problem of degradation of linear cancellation due to such movement.

Turning back to FIG. 3, the various functions of several of the blocks indicated may be accomplished via a hardware implementation using a dedicated logical circuit of various digital components, via a software program using a high speed processor or multiple high speed processors, or via an optimized combination of dedicated logical circuits and processor circuits executing various modules of a software program. It is understood that all such permutations are included within the scope of the present invention. Note that an appropriate display device may be employed in the scan conversion and display 229 such as a cathode ray tube (CRT) or other suitable device.

In addition, any software program of the present invention can be implemented in hardware, software, firmware, or a combination thereof. In the preferred embodiment(s), the program is implemented in software or firmware that is stored in a memory and that is executed by a suitable instruction execution system. If implemented in hardware, the present invention may comprise, for example, a dedicated logical circuit on an application specific integrated circuit (ASIC) or a combination of discrete logic components, etc.

Also, any software program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. An ultrasound imaging system adapted to generate a nonlinear ultrasound echo signal with reduced linear components, comprising:
    an excitation signal source configured to generate a first excitation signal and a second excitation signal;
    a transducer coupled to the excitation signal source, the transducer being configured to emit a first asymmetric ultrasonic pulse in response to the first excitation signal and a second asymmetric ultrasonic pulse in response to the second excitation signal, the first and second asymmetric ultrasonic pulses being emitted into a medium;
    a beamformer coupled to the transducer, the beamformer configured to generate a first echo signal and a second echo signal received by the transducer from the medium in response to the first and second asymmetric ultrasonic pulses;
    an envelope detector coupled to the beamformer, the envelope detector configured to generate a first echo envelope from the first echo signal and a second echo envelope from the second echo signal;
    an acoustic line memory coupled to the envelope detector for storing the first echo envelope; and
    an arithmetic junction coupled to an output of the envelope detector and the acoustic line memory, the arithmetic junction configured to perform a subtraction between the first echo envelope and the second echo envelope.

2. The system of claim 1, wherein:
    the first asymmetric pulse comprises at least one extended pressure peak on a first side of a threshold pressure axis and at least one shallow pressure peak on a second side of the threshold pressure axis; and
    the second asymmetric pulse is an inverted copy of the first asymmetric pulse.

3. The system of claim 2, wherein the magnitude of the absolute value of the extended pressure peak is greater than the magnitude of the shallow pressure peak.

4. The system of claim 3, wherein the magnitude of the absolute value of the extended pressure peak is greater than the magnitude of the absolute value of the shallow pressure peak by a factor of two.

5. An ultrasound imaging system adapted to generate a nonlinear ultrasound echo signal with reduced linear components, comprising:
    means for consecutively generating a first asymmetric ultrasonic pulse and a second asymmetric ultrasonic pulse, the first and second asymmetric ultrasonic pulses being configured for transmission into a medium;
    means for capturing a first echo signal and a second echo signal received from the medium, the first and second echo signals being generated in response to the first and second asymmetric ultrasonic pulses;
    means for generating a first envelope signal from the first echo signal and a second envelope signal from the second echo signal; and
    means, coupled to an output of the means for generating, for performing a subtraction between the first envelope signal and the second envelope signal.

6. The system of claim 5, means for performing a subtraction between the first envelope signal and the second envelope signal further comprises:
    a memory means for storing the first envelope signal; and
    subtraction means for subtracting the first envelope signal stored in the memory means from the second envelope signal.

7. The system of claim 5, wherein:
    the first asymmetric pulse comprises at least one extended pressure peak on a first side of a threshold pressure axis and at least one shallow pressure peak on a second side of the threshold pressure axis; and
    the second asymmetric pulse is an inverted copy of the first asymmetric pulse.

8. The system of claim 7, wherein the magnitude of the absolute value of the extended pressure peak is greater than the magnitude of the shallow pressure peak.

9. The system of claim 8, wherein the magnitude of the absolute value of the extended pressure peak is greater than the magnitude of the absolute value of the shallow pressure peak by a factor of two.

10. A method for generating a nonlinear ultrasound echo signal with reduced linear components in an ultrasound imaging system, comprising the steps of:

consecutively generating a first asymmetric ultrasonic pulse and a second asymmetric ultrasonic pulse, the first and second asymmetric ultrasonic pulses being emitted into a medium, thereby generating a first and second echo signals, respectively;

generating a first envelope signal from the first echo signal and a second envelope signal from the second echo signal; and performing subsequent to the step of generating, a subtraction between the first envelope signal and the second envelope signal.

11. The method of claim 10, wherein the step of consecutively generating a first asymmetric ultrasonic pulse and a second asymmetric ultrasonic pulse, the first and second asymmetric ultrasonic pulses being emitted into a medium, thereby generating a first and second echo signals, respectively, further comprises the steps of:

generating a first excitation signal and a second excitation signal;

applying the first and second excitation signals to a transducer, thereby generating the first and second asymmetric ultrasonic pulses, respectively; and generating the first echo signal and the second echo signal received from the medium using a beamformer.

12. The method of claim 10, wherein the step of performing a subtraction between the first envelope signal and the second envelope signal further comprises the steps of:

storing the first envelope signal in a memory; and subtracting the first envelope signal stored in the memory from the second envelope signal.

13. The method of claim 10, wherein step of consecutively generating the first and second asymmetric ultrasonic pulses further comprises the steps of:

generating the first asymmetric ultrasonic pulse comprising an extended pressure peak on a first side of a threshold pressure axis and at least one shallow pressure peak on a second side of the threshold pressure axis, wherein an absolute value of a magnitude of the extended pressure peak is greater than an absolute value of the shallow pressure peak; and generating the second asymmetric ultrasonic pulse, the second asymmetric pulse being an approximate inverted copy of the first asymmetric ultrasonic pulse.

* * * * *